(12) United States Patent
Kurek et al.

(10) Patent No.: US 12,415,688 B2
(45) Date of Patent: Sep. 16, 2025

(54) SUCTION GRIPPING DEVICE AND METHOD FOR RECEIVING AND STORING FLAT FLEXIBLE

(71) Applicant: Schott AG, Mainz (DE)

(72) Inventors: Klaus-Peter Kurek, Mainz (DE); Stefan Kreuzberger, Lorch (DE); Michael Waschbüsch, Undenheim (DE); Volker Plapper, Alzey (DE); Ulrich Engelhardt, Hannover (DE); Dennis Frick, Mainz (DE); Nils Becker, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 18/394,337

(22) Filed: Dec. 22, 2023

(65) Prior Publication Data

US 2024/0124250 A1    Apr. 18, 2024

Related U.S. Application Data

(63) Continuation of application No. PCT/EP2022/066689, filed on Jun. 20, 2022.

(30) Foreign Application Priority Data

Jun. 24, 2021 (DE) .................. 10 2021 116 381.1
Jun. 20, 2022 (WO) .................. PCT/EP2022/066689

(51) Int. Cl.
*B65G 59/04* (2006.01)
*B25J 15/06* (2006.01)
*B65G 47/91* (2006.01)

(52) U.S. Cl.
CPC .......... *B65G 59/04* (2013.01); *B25J 15/0616* (2013.01); *B65G 47/911* (2013.01); *B65G 2201/022* (2013.01)

(58) Field of Classification Search
CPC ... B65G 47/91; B25J 15/0616; B25J 15/0052; B25J 15/0625; B65H 3/48; B65H 3/128; B65H 3/14

(Continued)

(56) References Cited

U.S. PATENT DOCUMENTS 6,749,238 B2 * 6/2004 Hoyt ...................... B65G 47/91
                                                                  294/183
7,063,499 B2 * 6/2006 Miyamoto .......... H01L 21/6838
                                                                  414/744.8

(Continued)

FOREIGN PATENT DOCUMENTS

CN    112744588 A    5/2021
EP    3 572 362 A1   11/2019
JP    2014-118663 A   6/2014

OTHER PUBLICATIONS

Notification of the Transmission of the International Search Report and Written Opinion of the International Search Authority or Declaration dated Oct. 12, 2022 for International Application No. PCT/EP2022/066689 (12 pages).

*Primary Examiner* — Gregory W Adams
(74) *Attorney, Agent, or Firm* — TAYLOR & EDELSTEIN, PC

(57) ABSTRACT

A suction gripping device for picking up a plurality of substrates which are flat and flexible includes: a base body, which defines a plane; at least one gas suction vacuum module which is arranged on the base body and has at least one gas suction opening configured for withdrawing gas by suction and for generating a first vacuum so as to suction a respective one of the plurality of substrates against the suction gripping device; and at least one gas ejection vacuum module which is arranged on the base body and has a gas ejection opening configured for ejecting gas and for generating a second vacuum so as to suction the respective (Continued)

one of the plurality of substrates against the suction gripping device.

**11 Claims, 11 Drawing Sheets
(2 of 11 Drawing Sheet(s) Filed in Color)**

(58) Field of Classification Search
USPC .... 294/64.2, 64.3; 271/106, 107, 18, 90, 98, 271/97
See application file for complete search history.

(56) References Cited

U.S. PATENT DOCUMENTS

| | | | | |
|---|---|---|---|---|
| 7,155,307 B2 * | 12/2006 | Seemann | ................ | B63B 59/10 |
| | | | | 15/53.4 |
| 7,603,028 B2 * | 10/2009 | Yassour | ................ | H01L 21/00 |
| | | | | 118/725 |
| 7,715,615 B2 * | 5/2010 | Van Nice | ................ | B65H 43/04 |
| | | | | 382/152 |
| 8,317,185 B1 * | 11/2012 | Herrmann | ............ | B65H 3/0833 |
| | | | | 271/98 |
| 9,062,689 B2 | 6/2015 | Schaaf | | |
| 9,911,640 B2 * | 3/2018 | Kesil | ................ | B25J 15/0616 |
| 10,280,024 B2 * | 5/2019 | Niu | ................ | B65H 20/14 |
| 10,369,706 B2 * | 8/2019 | Petrovski | ............ | B65G 47/91 |
| 10,670,046 B2 * | 6/2020 | Aggarwal | ............ | F04D 29/40 |
| 10,889,007 B2 * | 1/2021 | Reinhold | ............ | B65G 47/91 |
| 11,110,614 B2 * | 9/2021 | Quast | ................ | B25J 15/0616 |
| 2006/0144624 A1 * | 7/2006 | Clark, Jr. | ............ | A63H 17/26 |
| | | | | 180/65.1 |
| 2010/0296903 A1 * | 11/2010 | Shah | ................ | H01L 21/6838 |
| | | | | 414/800 |
| 2019/0047158 A1 | 2/2019 | Petrovski | | |
| 2020/0216271 A1 * | 7/2020 | Chou | ................ | B65G 49/067 |
| 2020/0247628 A1 * | 8/2020 | Wade | ................ | B65H 3/0816 |

* cited by examiner

SUCTION GRIPPING DEVICE AND METHOD FOR RECEIVING AND STORING FLAT FLEXIBLE

CROSS REFERENCE TO RELATED APPLICATIONS

This is a continuation of PCT application no. PCT/EP2022/066689, entitled "SUCTION GRIPPING DEVICE AND METHOD FOR RECIVING AND STORING FLAT FLEXIBLE SUBSTRATES", filed Jun. 20, 2022, which is incorporated herein by reference. PCT application no. PCT/EP2022/066689 claims priority to German patent application no. 10 2021 116 381.1, filed Jun. 24, 2021, which is incorporated herein by reference.

BACKGROUND OF THE INVENTION

1. Field of the Invention

The present invention relates to suction gripping devices.

2. Description of the Related Art

Flat glasses are usually stacked by being stood vertically on the glass edge at a slight inclination angle, wherein a separating material, for example a paper sheet, is inserted between adjacent glass panes. Flat glasses are usually both stacked to form a stack and separated from an existing stack in such a position.

In the case of extremely thin glasses, for example thin glass, very thin glass or ultra-thin glass (UTG), for example with thicknesses of less than 100 µm, vertical stacking is generally no longer possible because of the lack of inherent rigidity of the glass and extremely sensitive glass edges, so that such glasses, together with intermediate layers, are stacked and transported in a "floating" manner and horizontally.

Compared to conventional thicker glasses, further characteristics are additionally to be taken into consideration when handling thin glasses, these characteristics being attributable to the special properties of thin glasses. These properties include in particular the flexibility of the glass itself and warping of the glass, which is sometimes pronounced and is caused by the internal stresses in the glass. In the case of glasses which are in the form of portions of a glass ribbon, drawn, for example, by the down-draw method, with or without two borders at the edges in which the glass ribbon has a significantly greater glass thickness, the effect of warping occurs to an even greater extent. Moreover, owing to the horizontal position of the glass and of the intermediate paper, the triboelectric forces are increased by way of gravity.

All these properties must be taken into consideration when separating, handling and transporting the substrates and also when setting the substrates down in a controlled manner Consequently, conventional handling systems, or suction gripping tools, cannot be used. In particular, thin glasses such as, for example, UTG are at high risk of breaking during suctioning, gripping, handling and transport.

Accordingly, what is needed in the art is a device and a method for automatically and safely removing substrates from a stack of horizontally stacked flat flexible substrates, for example UTG sheets including intermediate paper, in particular in order to separate the substrates onto a workpiece support, and/or for stacking flat flexible substrates to form a stack, in particular with intermediate paper, for example in order to stack them from a workpiece support into packaging.

What is also needed in the art is such a device and such a method for raw glass with a border, wherein raw glasses with a border in a stack can generally have a non-planar curved surface, wherein the degree of curvature typically increases as the height in the stack increases. What is also needed in the art is such a device and such a method for finished glass without a border. What is also needed in the art is such a device and such a method for stacks of air-impermeable and/or air-permeable substrates, for example a paper-UTG stack, wherein, in particular, the properties of a paper-UTG stack (height differences, air cushion, etc.) are to be managed reliably both when removing a UTG sheet and when setting down a UTG sheet or paper on such a stack.

What is also needed in the art is that the properties of the raw glass or finished glass (sheets) and paper, such as flexibility and warp and also air permeability, are controlled and managed reliably during handling, for example when removing the glass or paper. In addition, What is also needed in the art is that, when separating and adding paper and glass layers in the horizontal position from or to a stack, adhesion effects (triboelectric effects) are taken into consideration and precise positioning of the substrates is made possible, wherein floating ground effects (dynamic lift and negative lift as well as turbulence of the air cushion) are taken into consideration.

SUMMARY OF THE INVENTION

The present invention relates to a suction gripping device and to a method for picking up and setting down flat flexible substrates, in particular air-impermeable and/or air-permeable substrates, for example thin flexible glass panes and/or thin flexible paper sheets. The present invention provides a suction gripping device for picking up flat flexible substrates, in particular thin flexible glass panes and/or thin flexible paper sheets, optionally with thicknesses of less than 100 µm.

The suction gripping device according to the present invention includes a base body, in particular for attachment to a robotic arm, wherein the base body defines a plane which, when a substrate is picked up, optionally runs parallel to the substrate at least in some regions.

The suction gripping device according to the present invention further includes at least one gas suction vacuum module arranged on the base body, and at least one gas ejection vacuum module arranged on the base body.

The gas suction vacuum module includes at least one gas suction opening for withdrawing gas by suction and for generating a vacuum, in particular by way of the Venturi effect, in order to suction the substrate against the suction gripping device.

The gas ejection vacuum module includes at least one gas ejection opening for ejecting gas and for generating a vacuum, in particular by way of the Bernoulli effect, in order to suction the substrate against the suction gripping device.

In other words, the suction gripping device according to the present invention includes two vacuum modules which are based on different principles, wherein the gas suction vacuum module generates the vacuum by withdrawing gas by suction above the substrate, while the gas ejection vacuum module generates the vacuum by ejecting gas above the substrate, wherein the rapid flow of the gas past the substrate leads to the substrate being attracted by way of the Bernoulli effect.

The gas suction vacuum module can be in the form of or include, for example, a Venturi ejector. The gas suction vacuum module can in particular include the following: a gas inlet, in particular for the admission of compressed air, a gas outlet, in particular for discharging the compressed air again, a connection which runs from the gas inlet to the gas outlet and which has a constriction and a connection, which branches off between the gas inlet and the gas outlet, to the gas suction opening in order to generate the vacuum by way of the Venturi effect.

The gas ejection vacuum module can be in the form of or include, for example, a Bernoulli floating suction cup. The gas ejection vacuum module can in particular include the following: a gas inlet, in particular for the admission of compressed air, and a connection from the gas inlet to the gas ejection opening, in particular for discharging the compressed air again, wherein the gas ejection opening is configured in such a manner that the ejected gas runs at an angle to the plane of the base body, optionally strikes at an angle a substrate that is to be picked up, in order to generate the vacuum by way of the Bernoulli effect.

The gas ejection opening of the gas ejection vacuum module, or Bernoulli floating suction cup, is optionally configured in such a manner that the ejected gas is ejected in the form of a cone and optionally strikes the surface of the substrate in a cone shape, so that the gas flows past the substrate and generates the vacuum inside the cone. The normal to the cone is optionally perpendicular to the plane of the base body and optionally substantially perpendicular to the surface of a substrate that is to be picked up.

The gas suction vacuum module can have a contact surface for contacting at least in some regions a substrate that is to be picked up by the suction gripping device, wherein the gas suction opening is arranged in the form of a recess within the contact surface. The substrate can thus be suctioned against the contact surface by the withdrawal of gas by suction.

A plurality of gas suction openings in the form of recesses are optionally arranged within the contact surface, for example at least 10 or for example at least 50 gas suction openings, optionally at least 224 gas suction openings, optionally at least 1108 gas suction openings, optionally at least 1662 gas suction openings.

The contact surface of the gas suction vacuum module further optionally has a surface area of, for example, 100 square centimeters, optionally at least 530 square centimeters, optionally a surface area of at least 1280 square centimeters, optionally a surface area of at least 1984 square centimeters.

In an optional embodiment, the suction gripping device has a plurality of gas suction vacuum modules, in particular Venturi ejectors, and/or a plurality of gas ejection vacuum modules, in particular Bernoulli floating suction cups.

The gas suction vacuum module(s), in particular the contact surface(s) thereof, are optionally arranged closer to the center of the plane of the base body than the gas ejection vacuum module(s), in particular the gas ejection opening(s) thereof. This optionally applies in at least one direction running in the plane of the base body, particularly optionally in two mutually perpendicular directions running in the plane of the base body.

The gas suction vacuum module(s), in particular the contact surface(s) thereof, are additionally optionally arranged between the gas ejection vacuum modules, in particular the gas ejection openings thereof. This again optionally applies in at least one direction running in the plane of the base body, optionally in two mutually perpendicular directions running in the plane of the base body.

For example, the gas ejection vacuum modules (or Bernoulli floating suction cups) can be arranged at the edge of the base body. For example, the distance of the gas ejection vacuum module(s) from the edge of the base body can be less than 10 centimeters, in particular less than 5 centimeters, optionally less than 3.5 centimeters, optionally less than 0.4 centimeter.

In the case where the suction gripping device includes a plurality of gas suction vacuum modules, in particular Venturi ejectors, and a plurality of gas ejection vacuum modules, in particular Bernoulli floating suction cups, the gas suction vacuum modules and the gas ejection vacuum modules can be arranged, for example, in a mixed manner over the plane of the base body. In this case, but also in respect of other embodiments, it can be provided that the, or some of the, gas suction vacuum modules are activatable individually or in groups and/or the, or some of the, gas ejection vacuum modules are activatable individually or in groups, in particular in such a manner that locally limited suction can be provided within the plane of the base body. For example, locally limited suction can be provided by way of a partial quantity of the gas ejection vacuum modules which are arranged, for example, at the edge with respect to a substrate that is to be picked up, and/or locally limited suction can be provided by way of a partial quantity of the gas suction vacuum modules which are arranged, for example, centrally with respect to a substrate that is to be picked up. There can thus be provided, for example, a suction gripping device which can variably be used for different sizes of substrate.

According to an optional embodiment, the suction gripping device can be configured to pick up thin flexible raw glass panes with borders at opposite edges. Such a suction gripping device can also be referred to as a "raw glass gripper". In this case, the suction gripping device can include, in a first direction which runs from one border to the other border when a substrate has been picked up, a plurality of, for example, strip-shaped vacuum pressure module groups, which define a convex surface.

For example, the suction gripping device includes at least one gas suction vacuum module group which is arranged in a first direction between two gas ejection vacuum module groups which are optionally arranged at opposite edges of the base body.

The gas suction vacuum module group can include one or more, for example four, gas suction vacuum modules, the contact surfaces of which extend in a second direction running perpendicular to the first direction, optionally in the form of a strip. In other words, the gas suction vacuum module group can be longer in the second direction (longitudinally relative to the borders) than in the first direction (perpendicular to the borders).

The gas ejection vacuum module group can include a plurality of gas ejection vacuum modules which are arranged side by side in the second direction running perpendicular to the first direction.

The gas suction vacuum module(s), in particular the gas suction vacuum module group, can define a first suction direction, in particular define a first suction direction which runs perpendicular to the contact surface of the gas suction vacuum module and/or perpendicular to the plane of the base body.

The gas ejection vacuum module(s), in particular the gas ejection vacuum module groups, can further define second suction directions which run at an angle to the first suction direction, in particular in such a manner that the (first and second) suction directions define normals to a convex surface in order to pick up a flat flexible substrate having a concave curvature and/or opposite borders.

In a further development, the suction gripping device can include an adjusting way which is adapted to vary the inclination between the first suction direction and the second suction direction. To this end there can be provided, for example, an adjustment mechanism in order to vary an inclination between a gas ejection vacuum module, or a gas ejection vacuum module group, and a gas suction vacuum module, or a gas suction vacuum module group. In particular, the degree of tilt of the Bernoulli suction cups can be configured to be variably adjustable. The Bernoulli suction cups, for example, can thus be brought closer to the substrate that is to be picked up. When dismantling a stack of raw glasses with borders, the degree of tilt can gradually be reduced, for example, in order to take account of the fact that the concave curvature of the substrate to be picked up gradually decreases.

According to an optional embodiment, the suction gripping device can be configured to pick up thin flexible finished glass panes without borders. Such a suction gripping device can also be referred to as a "finished glass gripper". In this case, the suction gripping device can include a plurality of vacuum modules which define a substantially planar surface.

For example, the suction gripping device includes at least one gas suction vacuum module which is arranged both in a first direction and in a second direction running perpendicular to the first direction between at least four gas ejection vacuum modules, which are optionally arranged in corners or in edge regions of the base body.

The gas suction vacuum module(s) can further be arranged within a quadrilateral defined by four gas ejection vacuum modules, wherein optionally all the gas suction vacuum modules of the suction gripping device are arranged within such a quadrilateral. For example, it can thus be provided that the suction gripping device has no gas suction vacuum modules outside an envelope contour defined by the gas ejection vacuum modules.

The gas suction vacuum module(s) can define a first suction direction and the gas ejection vacuum module(s) can define a second suction direction, wherein the first and second suction directions run parallel to one another, in particular run perpendicular to the contact surface of the gas suction vacuum module and/or perpendicular to the plane of the base body.

It can be provided that the gas ejection vacuum module(s) are set back in the first suction direction, in the second suction direction, perpendicular to the contact surface of the gas suction vacuum module and/or perpendicular to the plane of the base body, optionally are set back by at least 0.2 centimeter, optionally by at least 0.45 centimeter, optionally by at least 0.5 centimeter.

In general, in a suction gripping device, the gas suction vacuum module(s) and the gas ejection vacuum module(s) are optionally each in the form of independent components, which can be obtainable, for example, as standard components. The modules can accordingly optionally be separated and/or spaced apart from one another, whereby mutual interference can be minimized.

For example, there can be a distance of at least 1 centimeter, optionally a distance of at least 2 centimeters, optionally a distance of at least 4 centimeters, between a gas suction vacuum module, in particular the contact surface thereof, and a gas ejection vacuum module, in particular the gas ejection opening thereof.

The gas suction vacuum module(s) and the gas ejection vacuum module(s) are optionally activatable separately, in particular in such a manner that a flat flexible substrate can first be suctioned by way of a gas ejection vacuum module and can then be suctioned by way of a gas suction vacuum module.

Furthermore, the gas suction vacuum module(s) each have a holding force of at least 12 newtons, optionally of at least 37 newtons, optionally of at least 43 newtons, and/or the gas ejection vacuum module(s) each have a holding force of at least 1.8 newtons, optionally of at least 3.2 newtons, optionally of at least 5.4 newtons.

The gas suction vacuum module(s) are optionally variably activatable in order to effect at least two different values of the holding force. Furthermore, the gas ejection vacuum module(s) are optionally variably activatable in order to effect at least two different values of the holding force. In particular, the suction gripping device can thus be in the form of a combined suction gripping device both for air-impermeable substrates and for air-permeable substrates.

The present invention relates further to a method for picking up flat flexible substrates, in particular thin flexible glass panes and/or thin flexible paper sheets, optionally with thicknesses of less than 100 µm.

The method according to the present invention includes using a suction gripping device having one or more gas suction vacuum modules and one or more gas ejection vacuum modules, in particular as described hereinbefore, and picking up a flat flexible substrate by way of the suction gripping device, wherein the flat flexible substrate is suctioned by way of the gas suction vacuum module and by way of the gas ejection vacuum module with a time offset. For example, the flat flexible substrate can first be suctioned by way of the gas suction vacuum module and can then be suctioned by way of the gas ejection vacuum module, or can first be suctioned by way of the gas ejection vacuum module and can then be suctioned by way of the gas suction vacuum module. Before the substrate is picked up, the suction gripping device is optionally moved closer to the substrate and/or the suction gripping device is positioned opposite the substrate, in particular in such a manner that the substrate is situated at least in some regions parallel to and opposite a plane defined by the suction gripping device.

The method can be configured for picking up an air-impermeable substrate, in particular a thin flexible glass pane, by way of the suction gripping device, wherein the air-impermeable substrate is first suctioned by way of the gas suction vacuum module(s) and is then picked up completely by way of the gas ejection vacuum module(s).

The method can additionally be configured for picking up an air-permeable substrate, in particular a thin flexible paper sheet, by way of the suction gripping device, wherein air is first blown through the air-permeable substrate and the substrate is lifted by way of the gas ejection vacuum module(s), and then the substrate is picked up completely by way of the gas suction vacuum module(s).

It can be provided that the method further includes releasing the flat flexible substrate from the suction gripping device by terminating suctioning by way of the gas suction vacuum module and/or by way of the gas ejection vacuum module. The flat flexible substrate, in particular an air-impermeable substrate, for example a thin flexible glass pane, can here be blown off the suction gripping device by way of the gas suction vacuum module.

In a further development, the method includes successively lifting air-impermeable substrates and air-permeable substrates from a stack of air-impermeable substrates and air-permeable substrates, in particular from a stack of glass panes and paper sheets, wherein both the air-impermeable substrates and the air-permeable substrates are lifted from the stack by the same suction gripping device.

In a further development, the method includes successively placing air-impermeable substrates and air-permeable substrates one on top of another to form a stack of air-impermeable substrates and air-permeable substrates, in particular a stack of glass panes and paper sheets, wherein both the air-impermeable substrates and the air-permeable substrates are placed on the stack by the same suction gripping device.

Finally, the present invention includes a stack of air-impermeable substrates and air-permeable substrates, in particular of thin flexible glass panes and thin flexible paper sheets, in particular produced or producible by the method described hereinbefore.

The stack can include, for example, at least 50, optionally at least 100, optionally at least 200, air-impermeable substrates, wherein the air-impermeable substrates are optionally stacked with a lateral tolerance of not more than ±2 mm, optionally not more than ±1 mm (placement accuracy of +/−1 mm) It can be provided that the stack includes not more than 400 air-impermeable substrates.

An air-permeable substrate is optionally arranged between each of the air-impermeable substrates, in particular in order to protect the surface of the air-impermeable substrates from scratches, lateral displacement and/or chemical reactions. For example, there can be a paper sheet between glasses, which protects the glass surface.

It can be provided that the air-permeable substrates protrude laterally beyond the air-impermeable substrates, optionally with an overhang of at least 10 mm, optionally with an overhang of at least 20 mm. For example, a paper sheet can be larger than a glass sheet, in particular with a minimum overhang of, for example, 22.5 mm all round.

The air-permeable substrates can have two opposite surfaces with different surface roughnesses, optionally a bottom surface with a higher surface roughness and a top surface with a lower surface roughness. The adhesion of an air-impermeable substrate lying beneath an air-permeable substrate on removal of an air-permeable substrate can thus advantageously be reduced, which can be advantageous in particular in the case of thin glasses (tribology effects).

Generally, in particular in respect of the stack, the air-impermeable substrates in particular have a thickness of less than 70 µm, optionally a thickness of less than 50 µm, optionally a thickness of less than 30 µm. A thickness of less than 15 µm may optionally also be provided.

Further generally, in particular in respect of the stack, the air-permeable substrates in particular have a thickness of less than 80 µm, optionally a thickness of less than 70 µm, poptionally a thickness of less than 50 µm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
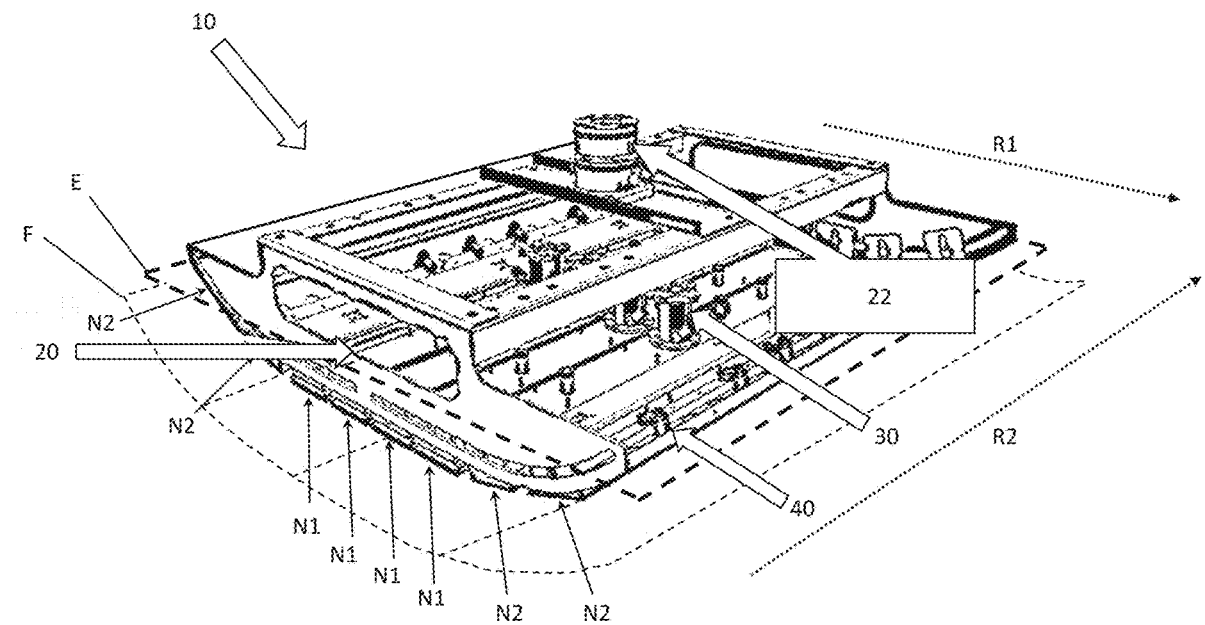
FIG. 1 is a three-dimensional view of a suction gripping device configured to pick up raw glass substrates.
Figure 2:
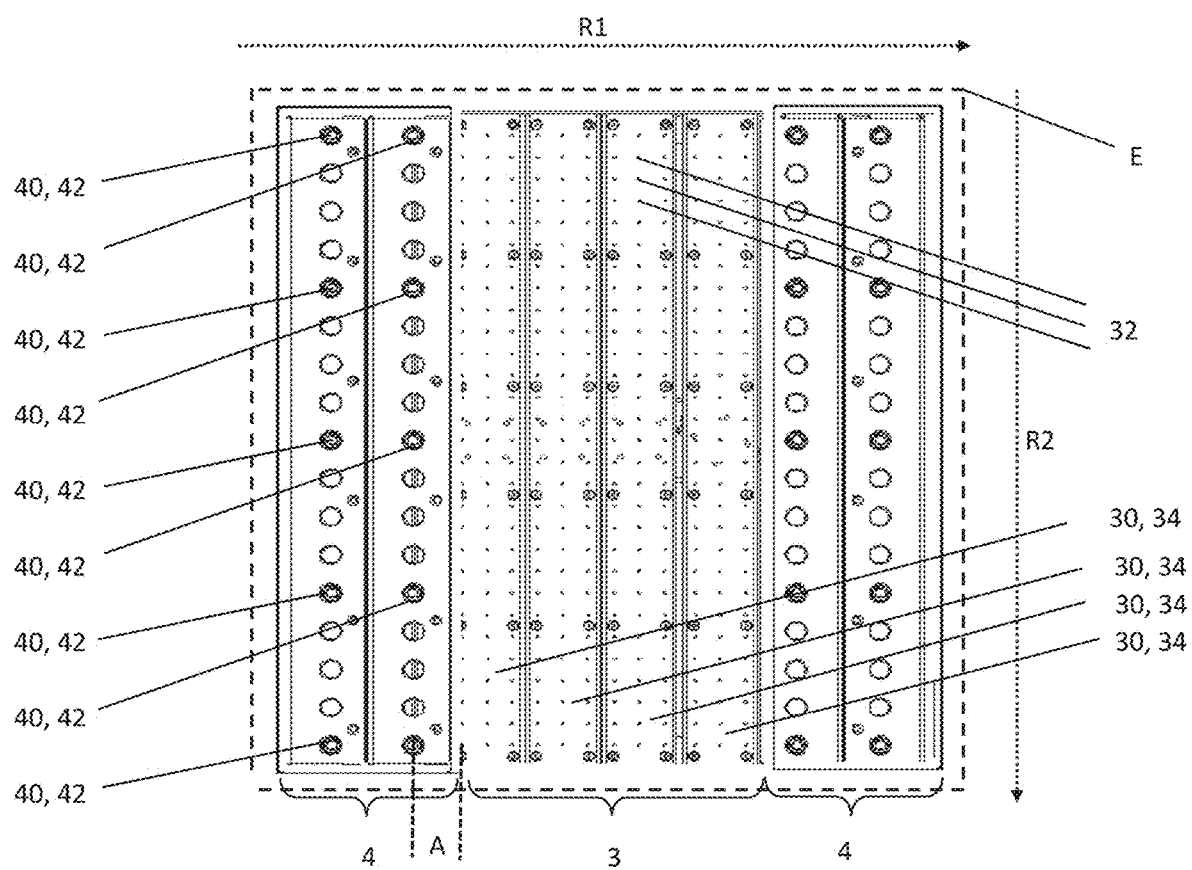
FIG. 2 is a view of the underside of the suction gripping device of FIG. 1.
Figure 3:
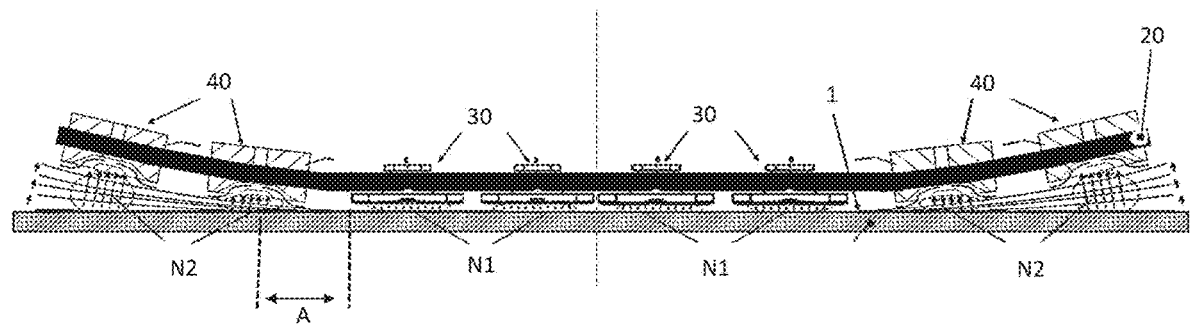
FIG. 3 is a sectional side view of the suction gripping device of FIG. 1.
Figure 6A:
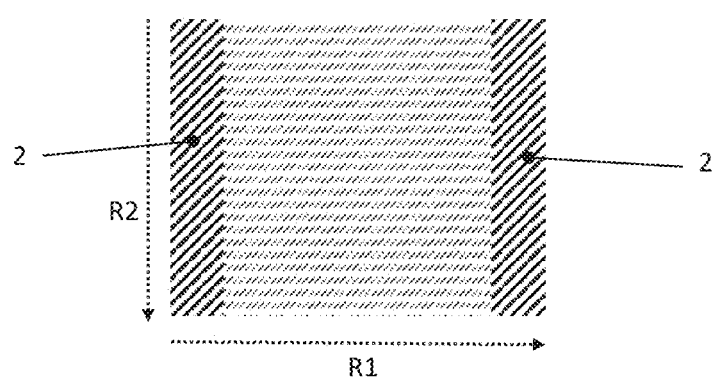
FIGS. 6A and 6B, wherein FIG. 6A (a top or bottom view) and FIG. 6B (a sectional side view) are views of a raw glass with borders.
Figure 6B:
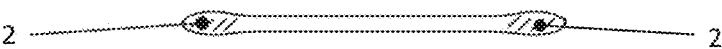

FIGS. 1-3 show a suction gripping device 10 which is configured in particular to pick up flat flexible substrates 1 having opposite borders 2, as shown in FIGS. 6A and 6B. Such substrates 1 having opposite borders are, for example, raw glass substrates. Because of the opposite borders 2, the substrates 1 have a concave surface, in particular when a large number of such substrates are stacked horizontally one on top of another. In the case of two opposite borders 2 which run in a direction R2, the substrates form a concave shape, for example in a direction R1 perpendicular thereto.

The suction gripping device 10 includes a base body 20 which defines a plane E. In order to pick up a flat flexible substrate 1 having a concave curvature, or opposite borders 2, the suction gripping device 10 includes a plurality of vacuum module groups 3, 4 in a direction R1 running in the plane E, said vacuum module groups being fastened to the base body 20 in a concave arrangement in the direction R1. More specifically, the vacuum module groups 3, 4 arranged side by side in the direction R1 define suction directions N1, N2 which define normals to a convex surface F. The vacuum module groups 3, 4 have vacuum modules, or suction modules, which are based on different operating principles.

Figure 5:
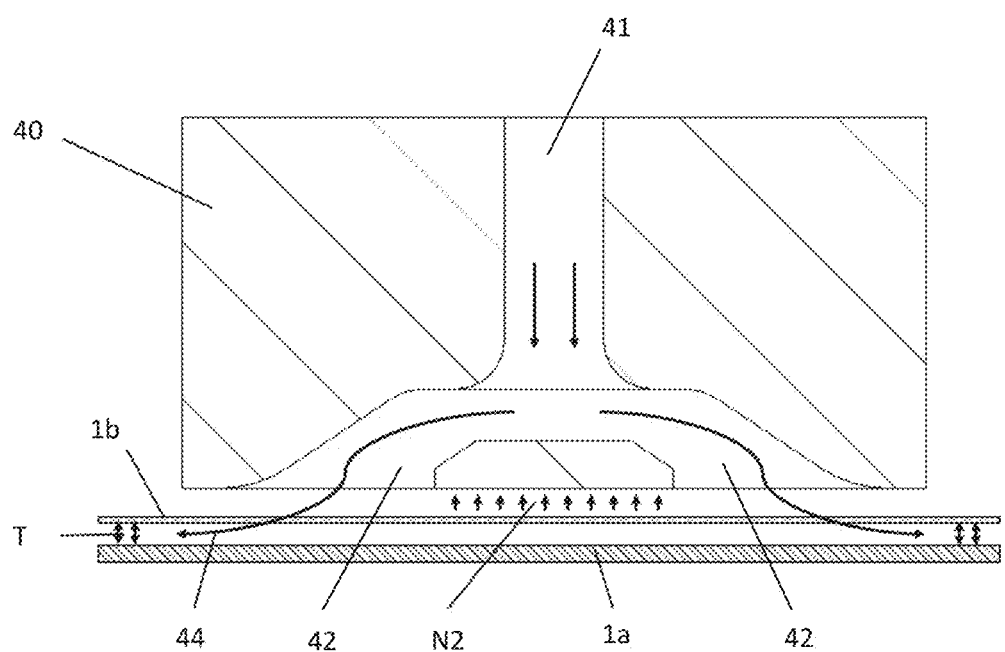
FIG. 5 is a sectional view of a Bernoulli floating suction cup.

The outer vacuum module groups 4 arranged opposite one another in the direction R1 are in the form of gas ejection vacuum module groups 4 and each include a plurality of gas ejection vacuum modules 40 which are arranged side-by-side transverse to the direction R1, for example in a direction R2 running perpendicular to the direction R1. The gas ejection vacuum modules 40 each have a gas ejection opening 42 and are in particular in the form of Bernoulli floating suction cups, as shown in FIG. 5 and described in greater detail hereinbelow. The gas ejection vacuum modules 40, which are in the form of Bernoulli suction cup modules, serve in particular for distance compensation in the edge region. In the example shown, the gas ejection vacuum module groups 4 each include a plurality of bars, here two bars, namely in each case an inner bar and an outer bar, wherein the outer bars are set back further in a direction perpendicular to the plane E.

Between the outer gas ejection vacuum module groups 4 there is arranged a gas suction vacuum module group 3 which includes a plurality of gas suction vacuum modules 30, which in this case are in the form of, or include, Venturi ejectors. The gas suction vacuum modules 30 each have a contact surface 34 which extends in the form of a strip in the direction R2. Within the contact surfaces 34 there is a large number of gas suction openings 32 for the withdrawal of gas by suction in order to suction the substrate 1 against the contact surface 34. The gas suction vacuum modules 30, which are in the form of vacuum gripper modules with flow ejectors, serve in particular to suction or fix the substrate over a large area. In the example shown, the gas suction vacuum module group 3 has in each case a plurality of bars, here four, wherein the bars are arranged at the same height in a direction perpendicular to the plane E. The gas ejection vacuum module groups 4 are at an angle and/or set back in a direction perpendicular to the plane E relative to the gas suction vacuum module group 3.

The suction gripping device 1 can be used as a suction gripping tool for UTG, in particular for picking up raw glasses with a border, which may in particular also be present in a stack, so that large concave curvatures can sometimes occur. The above-described suction gripping device 10 of convex form can flexibly be used for different glass curvatures. This is because the gas ejection vacuum modules 40 have a high suction effect across a distance and in particular cause the substrate to jump up. In this respect, the gas ejection vacuum modules 40 (e.g. Bernoulli floating suction cups) and the gas suction vacuum modules 30 (e.g. Venturi ejectors) advantageously cooperate in order to cause the substrate to jump up, in particular at its edge, by way of the gas ejection vacuum modules 40 and, in particular thereafter, to fix and/or suction the substrate over a large area by way of the gas suction vacuum modules 30.

Figure 4:
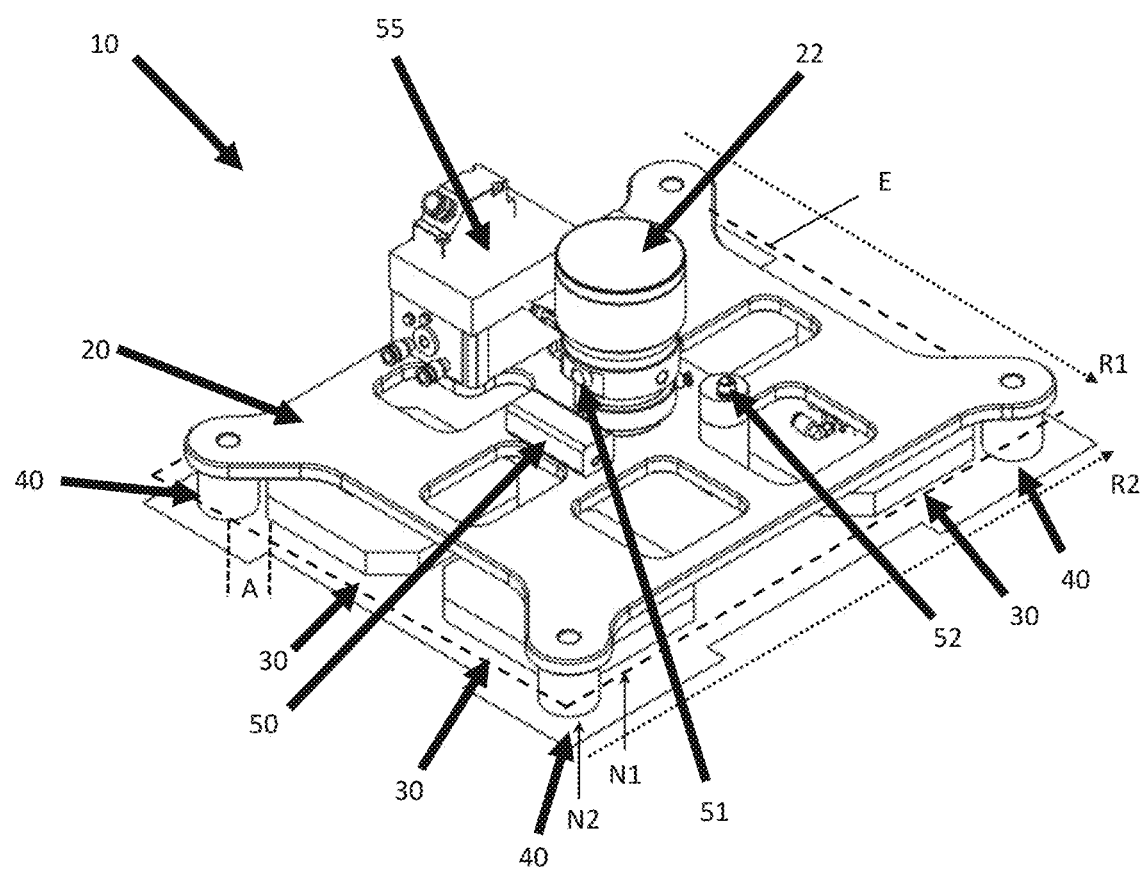
FIG. 4 is a three-dimensional view of a suction gripping device configured to pick up finished glass substrates.
Figure 7A:
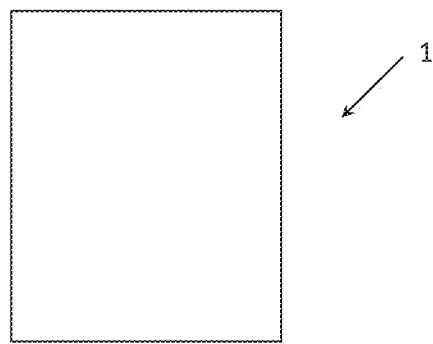
FIGS. 7A and 7B, wherein FIG. 7A (a top or bottom view) and FIG. 7B (a sectional side view) are views of a finished glass without borders.
Figure 7B:

FIG. 4 shows a suction gripping device 10 which is configured in particular to pick up flat flexible substrates 1 having a substantially planar surface as shown in FIGS. 7A and 7B. Such substrates are, for example, finished glass substrates which may have been obtained, for example, from raw glass substrates by removal of the borders.

The suction gripping device 10 has some aspects in common with the suction gripping device already described above, so that some of the features described above also apply to this embodiment and vice versa. The suction gripping device 10 includes a base body 20 which defines a plane E. In order to pick up a flat flexible substrate 1, the suction gripping device 10 includes vacuum modules 30, 40 which are based on different operating principles.

The vacuum modules 40 situated on the outside with respect to the plane E of the base body are in the form of gas ejection vacuum modules 40 (e.g. Bernoulli floating suction cups), while the vacuum modules 30 situated on the inside with respect to the plane E of the base body are in the form of gas suction vacuum modules 30 (e.g. Venturi ejectors) having a contact surface 34 and gas suction openings 32 arranged therein.

The suction gripping device 10 is configured in particular to pick up substrates 1 that lie flat or to pick up substrates 1 with slight warping, in particular for extremely thin materials (e.g. UTG) and/or transparent materials. Accordingly, the suction directions N1, N2 of the vacuum modules 30, 40 run parallel to one another. Because the outer gas ejection vacuum modules 40 have a suction effect over a larger distance, they are set back relative to the gas suction vacuum modules 30 in a direction perpendicular to the plane E. As a result, on the one hand distance compensation in the diagonal of the edge region can take place (Bernoulli suction cup) and on the other hand the substrate can be suctioned over a large area or can be fixed (flat suction cup). For example, the substrate can jump up at its edges and/or corners before the substrate is suctioned in the center.

FIG. 5 shows in detail a gas ejection vacuum module 40 in the form of a Bernoulli floating suction cup. Each gas ejection vacuum module 40 includes a gas inlet 41 for the admission of compressed air and an annular gas ejection opening 42 through which the compressed air is blown in the form of a cone 44 in the direction toward the substrate 1b. The ejected air flows past the substrate to the outside, so that, as a result of the Bernoulli effect, a vacuum with a suction direction N2 is generated within the gas cone 44.

The substrate 1b is in this case an air-permeable substrate (e.g. paper), so that the ejected gas flows at least partially through the substrate, which promotes lifting of the substrate 1b, in particular acts to separate the substrate from the underlying layer, in particular in the case of adhesion forces T between the substrate and the underlying layer, which in this case is in the form of an air-impermeable substrate 1a (e.g. glass).

Figure 8:
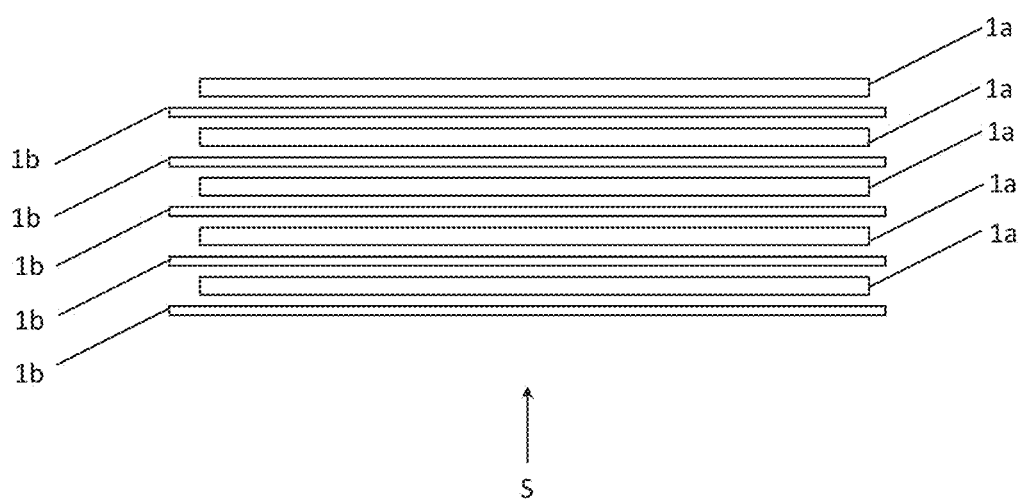
FIG. 8 is a side view of a stack of glass substrates and paper sheets.

FIG. 8 shows a stack of air-impermeable substrates 1a (e.g. glass) and air-permeable substrates 1b (e.g. paper) lying horizontally one on top of another. The suction gripping device 10 according to the present invention makes it possible to form such a mixed stack as well as to lift the various substrates from such a stack. A flat substrate 1a, 1b can first be suctioned by way of a gas suction vacuum module 30 and can then be suctioned by way of a gas ejection vacuum module 40 or, conversely, can first be suctioned by way of a gas ejection vacuum module 40 and can then be suctioned by way of a gas suction vacuum module 30. In the case of an air-impermeable substrate 1a, in particular a thin flexible glass pane, the substrate can first be suctioned in the center before it is lifted, or jumps up, at the edge. In the case of an air-permeable substrate 1b, in particular a thin flexible paper sheet, air can first be blown through the substrate, or it can jump up, before the substrate is suctioned and fixed over a large area.

Figure 9:
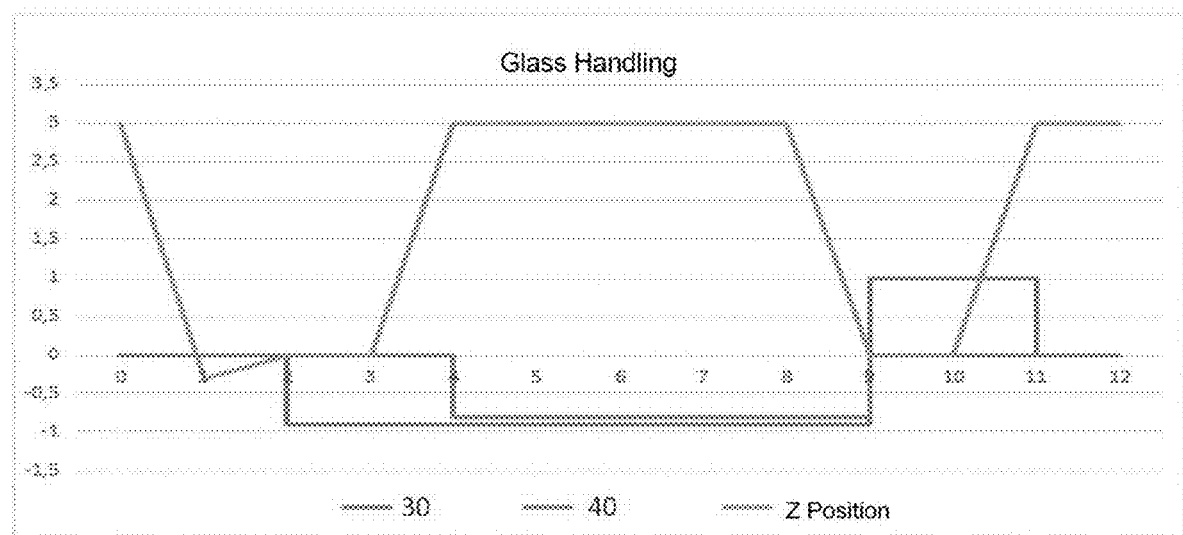
FIG. 9 shows a profile over time of the operation of a gas suction vacuum module and of a gas ejection vacuum module as well as the Z-position of the suction gripping device when picking up an air-impermeable substrate (e.g. glass)
Figure 10:
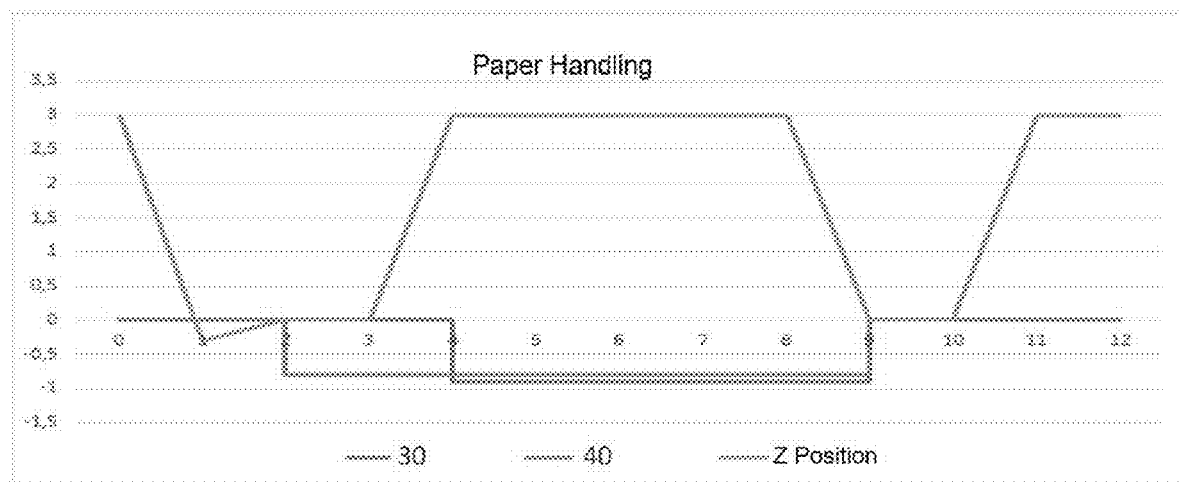
FIG. 10 shows a profile over time of the operation of a gas suction vacuum module and of a gas ejection vacuum module as well as the Z-position of the suction gripping device when picking up an air-permeable substrate (e.g. paper)

FIGS. 9 and 10 illustrate, for moving the suction gripping device closer to a substrate, picking up the substrate and releasing the substrate from the suction gripping device, sequences over time of the Z-position (normal to the plane E and/or perpendicular to the directions R1 and R2) of the suction gripping device and operating states of a gas suction vacuum module 30 and of a gas ejection vacuum module 40. The profile over time (s) is shown schematically on the X-axis, and on the one hand the pressure (bar) at the vacuum modules 30, 40 and on the other hand the position of the gripper in the Z-direction (cm) are shown on the Y-axis.

FIG. 9 illustrates a first example of a sequence, which can be used, for example, in the case of glass. After the suction gripping device has been moved closer to the substrate (s=2), the gas suction vacuum module 30 is first activated (pressure negative) in order to suction the substrate, for example in the middle. Then (s=4), the gas ejection vacuum module 40 is activated (pressure negative) in order to pick up the substrate completely, for example also at the edges. The suction gripping device can then move the picked-up substrate to a different location. In order to release the substrate from the suction gripping device (s=9), suctioning by way of the vacuum modules 30, 40 can be terminated, wherein it can additionally be provided that one of the modules, in particular the gas suction vacuum module 30, blows the substrate off (pressure positive).

FIG. 10 illustrates a second example of a sequence, which can be used, for example, in the case of paper. After the suction gripping device has been moved closer to the substrate (s=2), the gas ejection vacuum module 40 is first activated (pressure negative) in order to make the substrate jump up, for example at the edges. Then (s=4), the gas suction vacuum module 30 is activated (pressure negative) in order to pick up the substrate completely, for example also in the middle. The suction gripping device can then move the picked-up substrate to a different location. In order to release the substrate from the suction gripping device (s=9), suctioning by way of the vacuum modules 30, 40 can be terminated.

The combination of gas ejection vacuum modules 40 (e.g. Bernoulli floating suction cups) and gas suction vacuum modules 30 (e.g. Venturi ejectors) is advantageously suitable in particular for separating layers of air-impermeable substrates (e.g. thin flexible glass panes) and air-permeable substrates (e.g. thin flexible paper sheets), which are stacked, for example, horizontally one on top of another, for example alternately. This applies to curved raw glasses as well as to planar finished glasses.

An air-permeable substrate optionally includes paper or consists of paper, wherein a weight per unit area of between 20 and 80 g/m², optionally between 30 and 70 g/m², optionally between 40 and 60 g/m², for example 50 g/m², can be provided. The thickness of an air-permeable substrate can be, for example, between 40 and 100 micrometers, optionally between 50 and 90 micrometers, optionally between 60 and 70 micrometers.

An air-permeable substrate can further have one or more of the following properties according to DIN EN 1924-2: tensile strength in the machine direction (MD) between 20 and 80 N/15 mm, optionally between 30 and 50 N/15 mm Tensile strength in the cross direction (CD) between 10 and 40 N/15 mm, optionally between 15 and 25 N/15 mm Elongation in the machine direction (MD) between 1.5% and 1.9%, optionally between 1.6% and 1.8%. Elongation in the cross direction (CD) between 1.6% and 2.0%, optionally between 1.7% and 1.9%.

An air-permeable substrate can additionally have a bursting strength according to DIN EN ISO 2758 of between 90 and 130 kPa, optionally between 100 and 120 kPa, and/or a Cobb value (water) according to DIN EN 20 535 of between 10 and 40 g/m², optionally between 15 and 32 g/m², and/or an absolute moisture content according to DIN EN 20 287 of between 1% and 5%, optionally between 2% and 4%. An air-permeable substrate in particular has a moisture content of less than 20% (T=35°) and can be stored in a drying cabinet prior to application.

An air-permeable substrate can further have a pH which is between 5 and 9, optionally between 6 and 8, optionally between 7 and 8, wherein the pH can be determined in particular in accordance with ISO 8791-2.

An air-permeable substrate can have two opposite surfaces with different surface roughnesses, each of which adjoins, for example, a flat substrate. An option is given to a bottom surface with a higher surface roughness and a top surface with a lower surface roughness. The adhesion of a flat substrate lying beneath an air-permeable substrate on removal of an air-permeable substrate can thus advantageously be reduced, which can be advantageous in particular in the case of thin glasses.

The roughness of the surfaces of an air-permeable substrate can have the following values according to ISO 8791/4: roughness of the underside between 4 and 14 micrometers, optionally between 6 and 12 micrometers, optionally between 8 and 10 micrometers. Roughness of the bottom surface between 4 and 14 micrometers, optionally between 6 and 12 micrometers, optionally between 8 and 10 micrometers. Roughness of the top surface between 1 and 7 micrometers, optionally between 2 and 6 micrometers, optionally between 3 and 5 micrometers.

The chemistry of an air-permeable substrate (e.g. paper) is optionally adapted to an air-impermeable substrate (e.g. pH), in particular in order to avoid glass corrosion, leaving a mark and/or haze. In particular, with the air-permeable substrate, the formation of haze can be avoided (glass corrosion, reaction with acids, $H_2O+CO_2$ can react with Na at a glass surface to give $Na_2CO_3$ and lead to a salt layer on the surface). The air-permeable substrate is optionally technically chlorine- and acid-free. In particular, it can be avoided with the air-permeable substrate that the acid content and/or chlorine reacts with the surface of the substrate (e.g. glass) to give salts which are difficult to wash off. Moreover, the air-permeable substrate optionally has low particle emission and/or emits particles which can be washed off the air-impermeable substrate.

The suction gripping devices 10 shown in FIGS. 1-3 and FIG. 4 further optionally have a compensation unit 22 for the direction perpendicular to the plane E and optionally also a valve cluster 55 mounted on the base body 20. The suction gripping devices 10 can further be equipped with a sensor system for vacuum monitoring 50, a sensor system for force monitoring 51 and/or a sensor system for distance monitoring 52 (in particular in the direction perpendicular to the plane E). In order to take appropriate consideration of or to control the special properties of thin glasses (e.g. flexibility, warp, internal stresses, optional borders, horizontal position, intermediate paper, triboelectric effects, etc.), it is particularly advantageous to use flat suction cups in combination with floating suction cups according to the Bernoulli principle and an intelligent sensor system.

Accordingly, with the present invention, there is provided in particular a gripper for holding and/or moving a flat workpiece, in particular a thin glass. The gripper is suitable for the handling, for the transport, for the separation and joining of air-permeable and non-air-permeable, flexible materials. The gripper is additionally advantageously suitable for the low-contact gripping of substrates.

Figure 11:
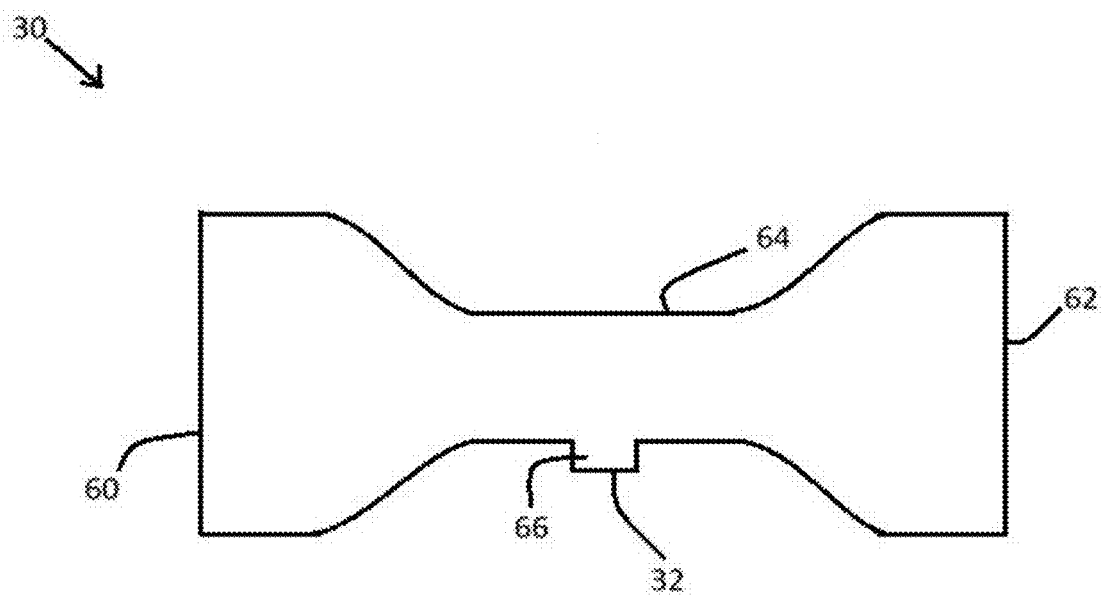
FIG. 11 is a schematic view of a gas suction vacuum module.

Referring now to FIG. 11, there is shown schematically gas suction vacuum module 30 which can be in the form of or include, for example, a Venturi ejector. The gas suction vacuum module 30 can in particular include the following: a gas inlet 60, in particular for the admission of compressed air, a gas outlet 62, in particular for discharging the compressed air again, a connection 64 which runs from the gas inlet 60 to the gas outlet 62 and which has a constriction and a connection 66, which branches off between the gas inlet 60 and the gas outlet 62, to the gas suction opening 32 in order to generate the vacuum by way of the Venturi effect.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A suction gripping device for picking up a plurality of substrates which are flat and flexible, the suction gripping device comprising:
   a base body, which defines a plane;
   at least one gas suction vacuum module which is arranged on the base body and has at least one gas suction opening configured for withdrawing gas by suction and for generating a first vacuum so as to suction a respective one of the plurality of substrates against the suction gripping device; and
   at least one gas ejection vacuum module which is arranged on the base body and has a gas ejection opening configured for ejecting gas and for generating a second vacuum so as to suction the respective one of the plurality of substrates against the suction gripping device,
   wherein at least one of:
   (a) the at least one gas suction vacuum module at least one of (i) forms or includes a Venturi ejector and (ii) includes the following: a gas inlet, a gas outlet, a first connection which runs from the gas inlet to the gas outlet and which has a constriction, and a second connection which branches off between the gas inlet and the gas outlet to the at least one gas suction opening so as to generate the first vacuum by way of a Venturi effect; and
   (b) the at least one gas ejection vacuum module at least one of (i) forms or includes a Bernoulli floating suction cup and (ii) includes the following: a gas inlet and a connection from the gas inlet to the gas ejection opening, wherein the gas ejection opening is configured such that an ejected gas runs at an angle to the plane of the base body so as to generate the second vacuum by means of a Bernoulli effect.

2. The suction gripping device according to claim 1, wherein the at least one gas suction vacuum module includes a contact surface configured for contacting—at least in a plurality of regions of the contact surface—the respective one of the plurality of substrates that is to be picked up by the suction gripping device,
   wherein the at least one gas suction opening is formed as a recess within the contact surface, and
   wherein the suction gripping device includes a plurality of the at least one gas suction opening each forming a respective one of the recess.

3. The suction gripping device according to claim 2, wherein at least one of:
   (a) the suction gripping device includes a plurality of the at least one gas suction vacuum module;
   (b) the suction gripping device includes a plurality of the at least one gas ejection vacuum modules;
   (c) the at least one gas suction vacuum module is arranged closer to a center of the plane of the base body than the at least one gas ejection vacuum module; and
   (d) the suction gripping device includes a plurality of the at least one gas ejection vacuum module, and the at least one gas suction vacuum module is arranged between the plurality of the at least one gas ejection vacuum module.

4. The suction gripping device according to claim 2, wherein the suction gripping device includes at least one gas suction vacuum module group and two gas ejection vacuum module groups, the at least one gas suction vacuum module group being arranged in a first direction between the two gas ejection vacuum module groups,
   wherein the at least one gas suction vacuum module group includes at least one of the at least one gas suction vacuum module, the contact surface of which extends in a second direction running perpendicular to the first direction, and
   wherein each of the two gas ejection vacuum module groups includes a plurality of the at least one gas ejection vacuum module which are arranged side-by-side in the second direction running perpendicular to the first direction.

5. The suction gripping device according to claim 4, wherein the base body includes opposing edges, the two gas ejection vacuum module groups being arranged at the opposing edges of the base body.

6. The suction gripping device according to claim 2, wherein the at least one gas suction vacuum module defines a first suction direction, and wherein the at least one gas ejection vacuum module defines a second suction direction which runs at an angle to the first suction direction.

7. The suction gripping device according to claim 2, wherein the suction gripping device includes at least four of the at least one gas ejection vacuum module, wherein the at least one gas suction vacuum module is arranged both in a first direction and in a second direction running perpendicular to the first direction between the at least four of the at least one gas ejection vacuum module, and wherein the at least one gas suction vacuum module is arranged within a quadrilateral defined by the at least four of the at least one gas ejection vacuum module.

8. The suction gripping device according to claim 2, wherein at least one of:
   (a) the at least one gas suction vacuum module defines a first suction direction and the at least one gas ejection vacuum module defines a second suction direction, wherein the first suction direction and the second suction direction run parallel to one another; and
   (b) the at least one gas ejection vacuum module is set back at least one of in the first suction direction, in the second suction direction, perpendicular to the contact surface of the at least one gas suction vacuum module, and perpendicular to the plane of the base body.

9. The suction gripping device according to claim 2, wherein at least one of:
   (a) the at least one gas suction vacuum module and the at least one gas ejection vacuum module each form respectively an independent component;
   (b) the suction gripping device includes a distance of at least 1 centimeter between the at least one gas suction vacuum module and the at least one gas ejection vacuum module; and
   (c) the at least one gas suction vacuum module and the at least one gas ejection vacuum module are activatable separately.

10. The suction gripping device according to claim 1, wherein at least one of:

(a) the at least one gas suction vacuum module includes a holding force of at least 12 newtons;
(b) the at least one gas ejection vacuum module includes a holding force of at least 1.8 newtons; and
(c) at least one of (i) the at least one gas suction vacuum module is variably activatable so as to effect at least two different values of the holding force of the at least one gas suction vacuum module, and (ii) the at least one gas ejection vacuum module is variably activatable so as to effect at least two different values of the holding force of the at least one gas ejection vacuum module.

11. The suction gripping device according to claim 1, wherein the plurality of substrates include at least one of (a) a plurality of thin flexible glass panes and (b) a plurality of thin flexible paper sheets, the plurality of thin flexible glass panes and the plurality of thin flexible paper sheets each including a thickness of less than 100 μm.

* * * * *